(12) United States Patent
Cho et al.

(10) Patent No.: US 9,771,282 B2
(45) Date of Patent: Sep. 26, 2017

(54) COMPOSITION FOR ELECTRODE OF CAPACITIVE DEIONIZATION APPARATUS, AND ELECTRODE INCLUDING SAME

(71) Applicant: Samsung Electronics Co., Ltd., Suwon-Si, Gyeonggi-Do (KR)

(72) Inventors: Myung Dong Cho, Hwaseong-si (KR); Hyun Seok Kim, Suwon-si (KR); Joon Seon Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 282 days.

(21) Appl. No.: 14/521,985

(22) Filed: Oct. 23, 2014

(65) Prior Publication Data

US 2015/0225266 A1 Aug. 13, 2015

(30) Foreign Application Priority Data

Feb. 10, 2014 (KR) .......................... 10-2014-0015105

(51) Int. Cl.
   *C02F 5/10* (2006.01)
   *C02F 1/469* (2006.01)
   (Continued)

(52) U.S. Cl.
   CPC .............. *C02F 1/4691* (2013.01); *B01J 41/13* (2017.01); *B01J 41/14* (2013.01); *B01J 47/08* (2013.01);
   (Continued)

(58) Field of Classification Search
   CPC ................ C02F 1/4691; C02F 2303/22; C02F 2001/46133; B01J 41/14; B01J 47/08; B01J 41/13
   (Continued)

(56) References Cited

U.S. PATENT DOCUMENTS 7,505,250 B2   3/2009   Cho et al.
7,835,137 B2   11/2010  Kang et al.
(Continued)

FOREIGN PATENT DOCUMENTS

JP      11081135 A  *  3/1999  ............ D06M 13/46
KR      20080107214 A   12/2008
(Continued)

OTHER PUBLICATIONS

Maruyama et al., JP 11-081135 A machine translation in English, Mar. 26, 1999.*

(Continued)

*Primary Examiner* — David Karst
(74) *Attorney, Agent, or Firm* — Harness, Dickey & Pierce, P.L.C.

(57) ABSTRACT

Disclosed are a composition for an electrode binder of a capacitive deionization apparatus including at least one a hydrophilic polymer and a bifunctional cross-linking agent having a hydroxy group or a carboxyl group at both terminal ends, and at least one anion exchange group therein, and the bifunctional cross-linking agent being cross-linkable with the at least one hydrophilic polymer, an electrode for a capacitive deionization apparatus including the composition, a capacitive deionization apparatus including the electrode, and a method of removing ions from a liquid by using the capacitive deionization apparatus.

16 Claims, 7 Drawing Sheets (51) Int. Cl.
*B01J 41/14* (2006.01)
*B01J 47/08* (2006.01)
*B01J 41/13* (2017.01)
*C02F 1/461* (2006.01)

(52) U.S. Cl.
CPC ..... *C02F 2001/46133* (2013.01); *C02F 2303/22* (2013.01)

(58) Field of Classification Search
USPC .................................................. 252/181, 180
See application file for complete search history.

(56) References Cited

U.S. PATENT DOCUMENTS

| | | | |
|---|---|---|---|
| 8,192,595 B2 | 6/2012 | Yang et al. | |
| 8,518,229 B2 | 8/2013 | Yang et al. | |
| 8,557,098 B2 | 10/2013 | Kim et al. | |
| 8,677,786 B2 | 3/2014 | Song et al. | |
| 2002/0185629 A1* | 12/2002 | Fujii | C08F 8/18 252/182.16 |
| 2009/0020430 A1 | 1/2009 | Yang et al. | |
| 2009/0311864 A1* | 12/2009 | Yamada | C09G 1/02 438/693 |
| 2010/0140096 A1 | 6/2010 | Yang et al. | |
| 2011/0042205 A1 | 2/2011 | Kim et al. | |
| 2011/0162960 A1 | 7/2011 | Yang et al. | |
| 2011/0162965 A1 | 7/2011 | Kim et al. | |
| 2011/0204027 A1* | 8/2011 | Moriya | B24B 37/015 216/53 |
| 2012/0228215 A1 | 9/2012 | Yang et al. | |
| 2012/0234763 A1 | 9/2012 | Kim et al. | |
| 2012/0241383 A1 | 9/2012 | Kim et al. | |
| 2013/0129592 A1 | 5/2013 | Kim et al. | |
| 2013/0175221 A1 | 7/2013 | Kim et al. | |
| 2013/0178356 A1 | 7/2013 | Kim et al. | |

FOREIGN PATENT DOCUMENTS

| | | |
|---|---|---|
| KR | 20090008622 A | 1/2009 |
| KR | 20090085756 A | 8/2009 |
| KR | 20100062571 A | 6/2010 |
| KR | 20100064633 A | 6/2010 |
| KR | 20100081538 A | 7/2010 |
| KR | 20100086283 A | 7/2010 |
| KR | 20110019573 A | 2/2011 |
| KR | 20110071701 A | 6/2011 |
| KR | 20110080393 A | 7/2011 |
| KR | 20110080893 A | 7/2011 |
| KR | 101063913 B1 | 9/2011 |
| KR | 20120101789 A | 9/2012 |
| KR | 20120104719 A | 9/2012 |
| KR | 20120107308 A | 10/2012 |
| KR | 101237258 B1 | 2/2013 |
| KR | 101254653 B1 | 4/2013 |
| KR | 20130056649 A | 5/2013 |
| KR | 20130081012 A | 7/2013 |
| KR | 20130081578 A | 7/2013 |
| WO | WO-2013183973 A1 | 12/2013 |

OTHER PUBLICATIONS

C. Nie et al. "Electrophoretic deposition of carbon nanotubes-polyacrylic acid composite film electrode for capacitive deionization" Electrochimica Acta 66 (2012) 106-109.

* cited by examiner

COMPOSITION FOR ELECTRODE OF CAPACITIVE DEIONIZATION APPARATUS, AND ELECTRODE INCLUDING SAME

CROSS-REFERENCE TO RELATED APPLICATION

This application claims priority from Korean Patent Application No. 10-2014-0015105 filed in the Korean Intellectual Property Office on Feb. 10, 2014, the entire contents of which are incorporated herein by reference.

BACKGROUND

1. Field

An electrode composition for a capacitive deionization apparatus and an electrode for a capacitive deionization apparatus are disclosed.

2. Description of the Related Art

In some regions, domestic water may include large amounts of minerals. In Europe and other regions, limestone substances frequently flow in underground water, and thus tap water in these regions typically contains a large amount of minerals. High mineral content in water (i.e., hard water) may have the disadvantage of easy generation of lime scales in interior walls of pipes and a sharp decrease in energy efficiency when used for home installations, for example, in a heat exchanger or a boiler. In addition, hard water is typically inappropriate for washing clothes or dishes. Therefore, there has been a demand for technology for removing ions from hard water to generate soft water, in particular, in an environmentally-friendly manner. Further, demands for seawater desalination have increased as larger areas of the world are suffering from water shortages.

A capacitive deionization (CDI) apparatus is a device for applying a voltage to porous electrodes having nano-sized pores to generate a polarity, thereby adsorbing ionic materials from a medium such as hard water onto the surface of the electrodes and thus removing the same therefrom. In the CDI apparatus, when a medium containing dissolved ions flows between two electrodes of an anode and a cathode and DC power having a low potential difference is applied thereto, the anionic components and the cationic components among the dissolved ions are adsorbed and concentrated onto the cathode and the anode, respectively. When an electric current flows in a reverse direction between the two electrodes by, for example, short-circuiting the two electrodes, the concentrated ions are desorbed from the electrodes. Since the CDI apparatus does not require a high potential difference, its energy efficiency is high, harmful ions may be removed together with the hard components when the ions are adsorbed, and its recycling process does not need any chemicals.

SUMMARY

One example embodiment provides an electrode composition for a capacitive deionization apparatus.

Another example embodiment provides an electrode for a capacitive deionization apparatus including the composition.

Another example embodiment provides a capacitive deionization apparatus including the electrode for a capacitive deionization apparatus.

One example embodiment provides a composition for an electrode binder of a capacitive deionization apparatus that includes at least one, or at least one kind of hydrophilic polymer and a bifunctional cross-linking agent having a hydroxy group or a carboxyl group at both terminal ends, and at least one anion exchange group therein, and the bifunctional cross-linking agent being capable of cross-linking with the at least one kind of hydrophilic polymer.

The at least one kind of hydrophilic polymer may be a polymer including a carboxyl group side chain being capable of ester-bonding with the hydroxy group of the bifunctional cross-linking agent, a polymer including a hydroxy group side chain being capable of ester-bonding with the carboxyl group of the cross-linking agent, or a polymer including both the hydroxy group and the carboxyl group.

The at least one kind of hydrophilic polymer may be at least one of polyacrylic acid (PAA), polyacrylic acid-co-maleic acid, polyvinyl alcohol (PVA), carboxylmethyl cellulose, hydroxypropyl cellulose, carboxylated polyvinylchloride, chitosan, polyacrylamide-co-acrylic acid, polystyrene-co-acrylic acid, and a combination thereof.

The hydrophilic polymer may be polyacrylic acid (PAA), polyvinyl alcohol (PVA), or a mixture thereof.

A weight average molecular weight of the hydrophilic polymer may be about 3000 to about 1,000,000.

The at least one anion exchange group in the bifunctional cross-linking agent may be one of a quaternary ammonium group (—NR'$_2$—) and a quaternary phosphonium group (—PR''$_2$—).

The bifunctional cross-linking agent, according to at least one example embodiment, may be represented by the following Chemical Formula 1.

[Chemical Formula 1]

In the above Chemical Formula 1, $R^1$ and $R^2$ the same or different and are independently a hydroxy group or a carboxyl group,

$R^3$ to $R^5$ are independently the same or different and are a C1 to C10 alkylene, a C3 to C10 cycloalkylene, a C6 to C12 arylene, or a combination thereof, $R^6$ to $R^9$ are independently the same or different and are hydrogen, a C1 to C10 alkyl, a C3 to C10 cycloalkyl, a C6 to C12 aryl, or a combination thereof, and X and Y are each independently a nitrogen (N) or a phosphorus (P) atom.

For example, the bifunctional cross-linking agent may be represented by the following Chemical Formula 2 or Chemical Formula 3.

[Chemical Formula 2]

-continued

[Chemical Formula 3]

In the above Chemical Formula 2 and Chemical Formula 3, $R^3$ to $R^5$ are independently the same or different and are a C1 to C10 alkylene, a C3 to C10 cycloalkylene, a C6 to C12 arylene, or a combination thereof, and $R^6$ to $R^9$ are independently the same or different and are hydrogen, a C1 to C10 alkyl, a C3 to C10 cycloalkyl, a C6 to C12 aryl, or a combination thereof.

The bifunctional cross-linking agent, according to at least one example embodiment, may be HETMEDA (N1,N2-bis(2-hydroxyethyl)-N1,N1,N2,N2-tetramethylethane-1,2-diaminium chloride) represented by the following Chemical Formula 4.

[Chemical Formula 4]

For example, the bifunctional cross-linking agent may be represented by the following Chemical Formula 5.

[Chemical Formula 5]

The composition may further include an additional hydrophilic polymer that does not cross-link with the bifunctional cross-linking agent besides the bifunctional cross-linking agent and at least one kind of cross-linkable hydrophilic polymer.

When the composition further includes the additional hydrophilic polymer that does not cross-link with the bifunctional cross-linking agent, the composition may further include an additional cross-linking agent besides the bifunctional cross-linking agent.

The additional cross-linking agent may include at least one of ethylene glycol, glycerol, 1,6-hexanediol, 1.4-butanediol, glutaric acid, glutaraldehyde, succinic acid, succinic anhydride, adipic acid, phthalic acid, ethylene glycol diglycidyl ether, sulfosuccinic acid, sulfosalicylic acid, succinic acid amine, ethylenediamine, or a combination thereof.

The composition may further include an ion exchange functional group.

The ion exchange functional group may include at least one of tetrabutylammonium hydroxide, tetrabutylammonium acetate, tetraethylammonium hydroxide, tetraethylammonium acetate, tetramethylammonium hydroxide, tetramethylammonium acetate, or a combination thereof.

The binder composition may further include water as a solvent.

The bifunctional cross-linking agent may be included in an amount of about 0.5 wt % to about 60 wt % based on the weight of the at least one kind of cross-linkable hydrophilic polymer.

The ion exchange functional group may be included in an amount of about 5 wt % to about 50 wt % based on the weight of the at least one kind of cross-linkable hydrophilic polymer.

The binder composition may further include water as a solvent.

The binder composition may be dissolved at a concentration of about 5 to about 30 wt %, for example about 10 to about 20 wt %, in a solvent.

Another example embodiment provides an electrode composition for a capacitive deionization apparatus including the binder composition and the electrode active material.

The electrode active material may be an activated carbon-based material.

The activated carbon-based material may be an activated carbon powder, an activated carbon fiber, carbon nanotubes, carbon aerogel, mesoporous carbon, graphite oxide, or a mixture thereof.

The electrode active material may be included in an amount of about 50 wt % to about 400 wt %, for example about 100 wt % to about 300 wt %, in the electrode composition based on the total amount of the hydrophilic polymer in the binder composition.

The electrode composition may further include a conductive material.

The conductive material may be at least one carbon-based material such as VGCF (Vapor Growth Carbon Fiber), natural graphite, artificial graphite, acetylene black, ketjen black, and/or carbon fiber.

The conductive material may be included in an amount of about 1 wt % to about 30 wt % based on the amount of the electrode active material.

An example embodiment provides an electrode for a capacitive deionization apparatus including the electrode composition for a capacitive deionization apparatus, and a method of manufacturing the same.

The electrode for a capacitive deionization apparatus may be manufactured by coating the electrode composition for a capacitive deionization apparatus on a current collector.

The current collector may be, for example, a sheet, a thin film, or a plain weave gold mesh including graphite.

The electrode composition may be coated on the current collector in a method of dip coating, spray coating, knife casting, doctor blade coating, spin coating, and the like.

An embodiment provides a capacitive deionization apparatus including the electrode for a capacitive deionization apparatus as a cathode or an anode, another electrode facing the anode or the cathode, and a spacer disposed between the cathode and the anode.

The spacer may have an open mesh, non-woven fabric, woven fabric, or foam shape.

The deionization apparatus may further include a charge barrier disposed between the electrode and the spacer and including a different material from the electrode material.

An example embodiment provides a method of removing ions from a fluid using the capacitive deionization apparatus.

The example method of removing ions from a fluid using the capacitive deionization apparatus includes providing a capacitive deionization apparatus including the electrode for a capacitive deionization apparatus, another electrode facing the electrode, and a spacer disposed between the electrodes, and applying a voltage to the electrodes while supplying an ion-containing fluid into the capacitive deionization apparatus.

The example method of treating the fluid may further include desorbing ions adsorbed on the electrodes by short-circuiting the electrodes, or applying a reverse voltage to the electrodes.

DETAILED DESCRIPTION

Advantages and characteristics of this disclosure, and a method for achieving the same, will become evident referring to the following example embodiments together with the drawings attached hereto. However, this disclosure may be embodied in many different forms and is not to be construed as limited to the example embodiments set forth herein; rather, these example embodiments are provided so that this disclosure will satisfy applicable legal requirements. Therefore, in some example embodiments, well-known process technologies are not explained in detail in order to avoid vague interpretation of the present invention. If not defined otherwise, all terms (including technical and scientific terms) in the specification may be defined as commonly understood by one skilled in the art. The terms defined in a generally-used dictionary may not be interpreted ideally or exaggeratedly unless clearly defined to the contrary. In addition, unless explicitly described to the contrary, the word "comprise" and variations such as "comprises" or "comprising" will be understood to imply the inclusion of stated elements but not the exclusion of any other elements.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list. Example embodiments may be described referring to example schematic views. The same reference numerals designate the same constituent elements throughout the specification.

As used herein, the term "capacitive deionization apparatus" refers to a device that may separate/concentrate ions by passing fluids to be separated or to be concentrated including at least one ion component through a flow path formed between at least one pair of porous electrodes and applying a voltage thereto so as to adsorb the ion components on the pores in the electrodes. The "capacitive deionization apparatus" may have any geometric structure.

At least one example embodiment provides a composition for an electrode binder of a capacitive deionization apparatus that includes at least one kind of a hydrophilic polymer and a bifunctional cross-linking agent having each hydroxy group or carboxyl group at both terminal ends, and at least one anion exchange group therein, and the bifunctional cross-linking agent being capable of cross-linking with the at least one kind of hydrophilic polymer.

The composition for a binder is mixed with an electrode active material, and increases a bonding force in the electrode active material itself and/or between the electrode active material and a current collector during manufacture of an electrode for a capacitive deionization apparatus.

In the composition for a binder, since at least one kind of hydrophilic polymer is cross-linked through the bifunctional cross-linking agent and thus mixed with an electrode active material, the composition may further reinforce bonding inside the electrode active material and between the electrode active material and the current collector, and is prevented from dissolving in a solvent during formation of the electrode.

The cross-linking bond between the at least one kind of hydrophilic polymer and the bifunctional cross-linking agent may be formed through an ester bond of a hydroxy group with a carboxyl group side chain of the hydrophilic polymer when the hydroxy group is at one terminal end of the cross-linking agent, and also through an ester bond of a carboxyl group with a hydroxy group side chain of a hydrophilic polymer when the carboxyl group is at the terminal end of the cross-linking agent.

Therefore, the at least one kind of hydrophilic polymer may be any polymer having a hydroxy group or a carboxyl group in the side chain, and may be, for example, at least one of polyacrylic acid (PAA) polyacrylic acid-co-maleic acid, polyvinyl alcohol (PVA), carboxylmethyl cellulose, hydroxypropyl cellulose, carboxylated polyvinylchloride, chitosan, polyacrylamide-co-acrylic acid, polystyrene-co-acrylic acid, or a combination thereof.

For example, the hydrophilic polymer may be polyacrylic acid (PAA), polyvinyl alcohol (PVA), or a mixture thereof.

A weight average molecular weight of the hydrophilic polymer that is cross-linkable may be about 3000 to about 1,000,000, for example about 10,000 to about 500,000.

The at least one anion exchange group in the bifunctional cross-linking agent may be a quaternary ammonium group ($-NR'_2-$) or a quaternary phosphonium group ($-PR''_2-$).

For example, the bifunctional cross-linking agent may be represented by the following Chemical Formula 1.

[Chemical Formula 1]

In the above Chemical Formula 1, $R^1$ and $R^2$ are the same or different and are independently a hydroxy group or a carboxyl group, $R^3$ to $R^5$ are independently the same or different and are a C1 to C10 alkylene, a C3 to C10 cycloalkylene, a C6 to C12 arylene, or a combination thereof,

$R^6$ to $R^9$ are independently the same or different and are hydrogen, a C1 to C10 alkyl, a C3 to C10 cycloalkyl, a C6 to C12 aryl, or a combination thereof, and X and Y are each independently a nitrogen (N) or a phosphorus (P) atom.

In other words, the bifunctional cross-linking agent has a hydroxy group at both terminal ends, a carboxyl group at both terminal ends, or the hydroxy group at one terminal end and the carboxyl group at the other terminal end. The bifunctional cross-linking agent also has an anion exchange group such as a quaternary ammonium group or a quaternary phosphonium group in a molecule and thus ion exchange capability as well as cross-linking capability.

The bifunctional cross-linking agent may be represented by the following Chemical Formula 2 or 3.

[Chemical Formula 2]

[Chemical Formula 3]

In the above Chemical Formulas 2 and 3, $R^3$ to $R^9$ are the same as defined in the above Chemical Formula 1.

For example, the bifunctional cross-linking agent may be HETMEDA (N1,N2-bis(2-hydroxyethyl)-N1,N1,N2,N2-te- tramethylethane-1,2-diaminium chloride) represented by the following Chemical Formula 4.

[Chemical Formula 4]

For example, the bifunctional cross-linking agent may be a compound represented by the following Chemical Formula 5.

[Chemical Formula 5]

A cross-linking copolymer obtained by cross-linking a hydrophilic polymer having a carboxyl group side chain using the bifunctional cross-linking agent represented by the above Chemical Formula 4 may be schematically represented by the following Chemical Formula 6.

(Chemical Formula 6)

In other words, since a hydroxy group or a carboxyl group at both terminal ends of the bifunctional cross-linking agent is respectively cross-linked with a carboxyl group or a hydroxy group at the side chain of each polymer, two or more polymers may be cross-linked through the bifunctional cross-linking agent. Herein, an anion exchange group in the bifunctional cross-linking agent is maintained, and this is the same effect as the anion exchange group being included over the cross-linked polymer or over a binder composition including the polymer.

On the other hand, when a conventional cross-linking agent including no ion exchange group such as glutaric acid is used to cross-link a polymer such as polyvinyl alcohol (PVA), an ion exchange functional group may be separately added to the binder composition to apply an ion exchange property to the polymer. Herein, since the polymer is bonded with the ion exchange functional group other than the cross-linking agent, the number of cross-linking bonds among the polymers is limited. This is schematically shown in FIG. 3.

Figure 3:
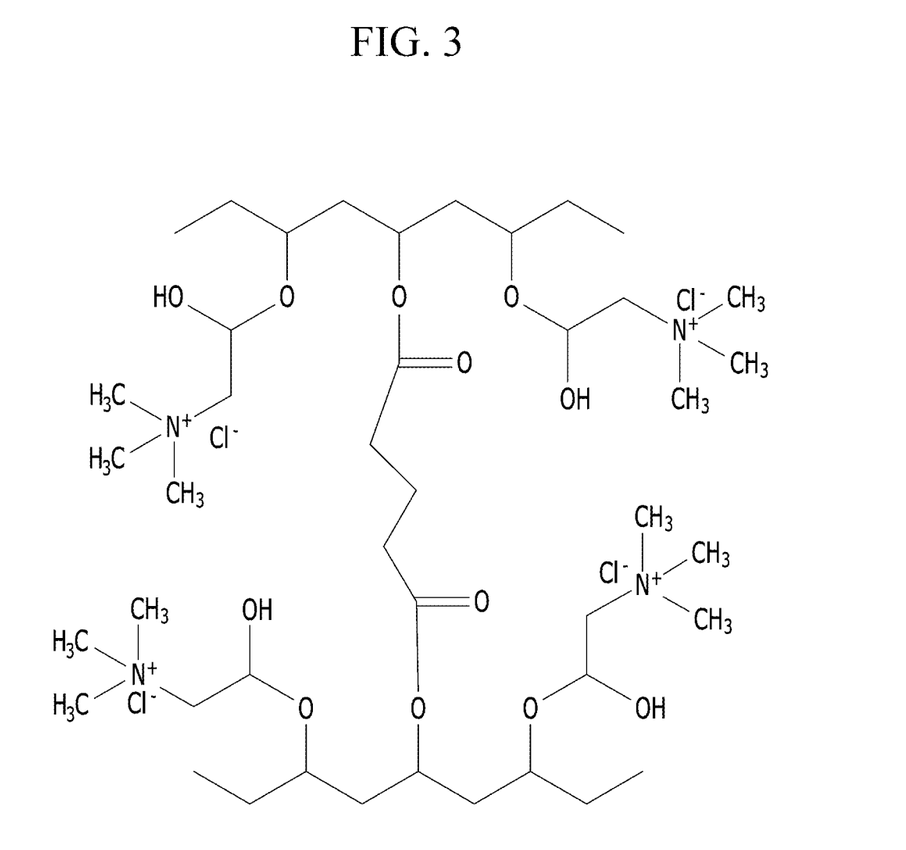
FIG. 3 is a schematic view showing a cross-linking state and a bonding state of a polyvinyl alcohol (PVA) polymer when the polyvinyl alcohol (PVA) polymer is cross-linked at one point through glutaric acid as the cross-linking agent, and 4 molecules of an anion exchange functional group are grafted thereto, according to at least one example embodiment.

As shown in FIG. 3, when a polymer is cross-linked with glutaric acid through one site of each of three cross-linking bond sites (a moiety having a hydroxy group side chain) of two molecules of polyvinyl alcohol (PVA), an ion exchange group additionally added to apply an ion exchange property to the polymer is respectively grafted through each of four remaining hydroxy groups. In other word, four ion exchange groups are produced.

Figure 4:
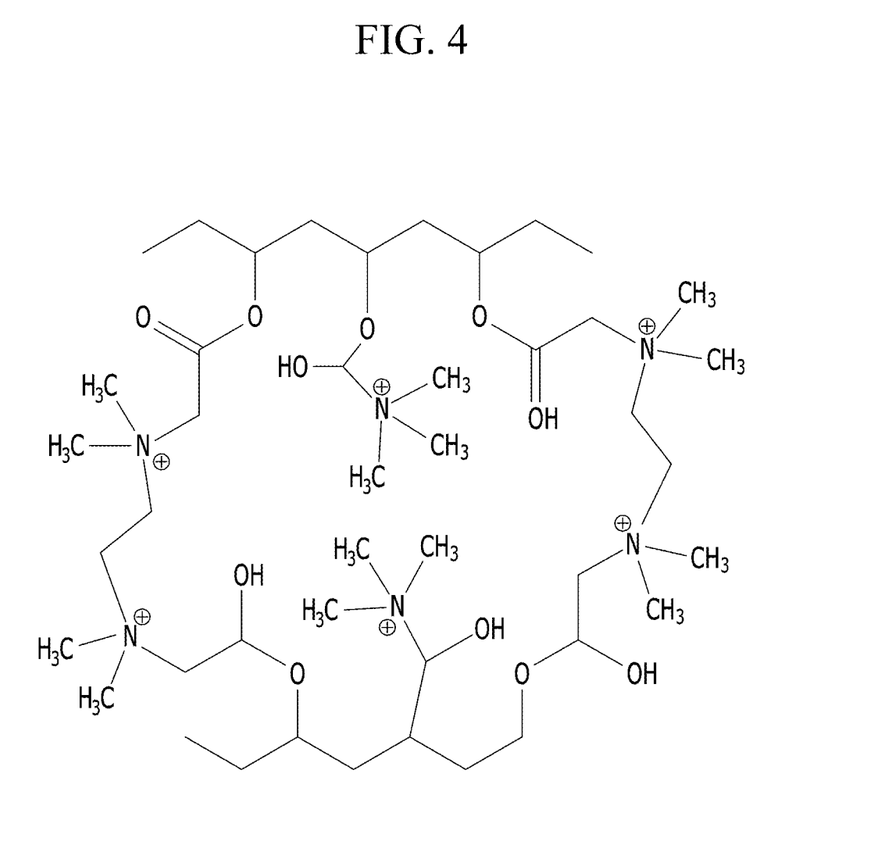
FIG. 4 is a schematic view showing a cross-linking state and a bonding state of a polyacrylic acid (PAA) polymer when the polyacrylic acid (PAA) polymer is cross-linked at two points through the HETMEDA according to an example embodiment as a bifunctional cross-linking agent, and two molecules of an anion exchange functional group are added and grafted thereto, according to at least one example embodiment.

On the other hand, when two molecules of PAA are cross-linked by using a bifunctional cross-linking agent of HETMEDA according to at least one example embodiment, for example, as shown in FIG. 4, when two molecules of the HETMEDA are cross-linked at two out of three carboxyl group side chain groups in each polymer, and two molecules of an ion exchange group are respectively grafted into the remaining carboxyl groups, the two ion exchange group moieties applied by the ion exchange group and four ammonium groups introduced by the HETMEDA, and thus six anion exchange groups in total, may be introduced.

Accordingly, the bifunctional cross-linking agent may impart anion exchange performance to a polymer as well as cross-linking the polymers, and thus the number of cross-linking bond of the polymer is not limited. In addition, ion conductivity of the polymer is increased along with the number of cross-linking bonds as shown in the following example (refer to FIG. 5).

However, the composition may further include other additional polymers not cross-linking with the bifunctional cross-linking agent other than a hydrophilic polymer cross-linkable with the bifunctional cross-linking agent. Herein, the composition may include an additional cross-linking agent to cross-link the additional polymers other than the bifunctional cross-linking agent.

The additional cross-linking agent may include at least one of ethylene glycol, glycerol, 1,6-hexanediol, 1.4-butanediol, glutaric acid, glutaraldehyde, succinic acid, succinic anhydride, adipic acid, phthalic acid, ethylene glycol diglycidyl ether, sulfosuccinic acid, sulfosalicylic acid, succinic acid amine, ethylenediamine, or a combination thereof, but may be any well-known cross-linking agent in this art in accordance with a kind of the additional polymer.

The composition may further include an ion exchange functional group.

As aforementioned, the bifunctional cross-linking agent may play a role of an ion exchange functional group or further include an additional ion exchange functional group to have higher ion conductivity if necessary.

According to at least one example embodiment, the ion exchange functional group may be at least one of tetrabutylammonium hydroxide, tetrabutylammonium acetate, tetraethylammonium hydroxide, tetraethylammonium acetate, tetramethylammonium hydroxide, tetramethylammonium acetate, or a combination thereof, but is not limited thereto.

The binder composition may further include water as a solvent.

The bifunctional cross-linking agent may be included in an amount of about 0.5 wt % to about 60 wt % in a binder composition based on the weight of the at least one kind of cross-linkable hydrophilic polymer.

As described above, since the bifunctional cross-linking agent includes an anion exchange group, a separate ion exchange functional group is not needed when a polymer is cross-linked by the bifunctional cross-linking agent. Accordingly, the composition for a binder may include the bifunctional cross-linking agent in a larger amount than a composition necessarily including an ion exchange functional group.

When the composition includes an additional polymer that does not cross-link with the bifunctional cross-linking agent, an additional cross-linking agent for cross-linking the additional polymer may be included in an amount of about 0.5 wt % to about 60 wt % based on the weight of the additional polymer.

The ion exchange functional group may be included in an amount of about 5 wt % to about 50 wt % based on the weight of the at least one kind of cross-linkable hydrophilic polymer.

Since the binder composition includes a hydrophilic polymer as a main component and has an ion exchange property and thus uses a hydrophilic solvent such as water, the binder composition may be environmentally friendly. The polymer may be dissolved in an amount of about 5 wt % to about 30 wt %, for example about 10 to about 20 wt %, in a solvent.

The at least one kind of cross-linkable hydrophilic polymer and the other additional polymers may have a weight average molecular weight in a range of about 3000 to about 1,000,000, for example about 10,000 to about 500,000.

When the polymer has a weight average molecular weight and a concentration in a solvent within the range, the binder obtained from the polymer and an electrode slurry obtained from the binder and an electrode active material may have appropriate viscosity, and the polymer may have excellent bonding characteristics with the electrode active material. When the polymer has too large or small a weight average molecular weight, the polymer may be mixed with additional polymers having different weight average molecular weights from that of the polymer to adjust viscosity.

Another example embodiment provides an electrode composition for a capacitive deionization apparatus including the binder composition and an electrode active material.

The electrode active material may include an activated carbon-based material, for example, an activated carbon powder, an activated carbon fiber, carbon nanotubes, carbon aerogel, mesoporous carbon, graphite oxide, or a mixture thereof.

The electrode active material may be included in an amount of about 50 wt % to about 400 wt %, for example about 100 wt % to about 300 wt %, in the electrode composition based on the amount of the total hydrophilic polymer in the binder composition.

According to at least one example embodiment, the binder composition may be included in an amount of less than or equal to about 40 wt % in the electrode composition based on the amount of the total electrode composition. For example, the binder composition may be included in an amount of about 10 wt % to about 40 wt %, for example about 20 wt % to about 30 wt %, based on the amount of the total electrode composition. When the electrode composition includes the binder composition out of the range, ion exchange capability of the electrode composition may be deteriorated since an active material is not sufficiently included in the electrode composition, while when the binder composition is included in a small amount, its charge barrier role in an electrode may be deteriorated.

The electrode composition may further include a conductive material.

The conductive material may be at least one carbon-based material such as VGCF (Vapor Growth Carbon Fiber), natural graphite, artificial graphite, acetylene black, ketjen black, and/or carbon fiber.

The conductive material may be included in an amount of about 1 wt % to about 30 wt % based on the amount of the electrode active material. When the conductive material is included in an amount of less than 1 wt %, an electrode may have insufficient conductivity, while when the conductive material is included in an amount of greater than 30 wt %, the electrode composition may not be economical, but porosity of an electrode may also be decreased.

The electrode composition may be prepared into an electrode slurry when the binder composition further includes a solvent such as water and the like, and this electrode slurry may be coated on a current collector, manufacturing an electrode.

Accordingly, another example embodiment provides an electrode for a capacitive deionization apparatus including the electrode composition for a capacitive deionization apparatus and a method of manufacturing the same.

The electrode may be a cathode.

As described above, the binder composition according to the example embodiment includes the bifunctional cross-linking agent including the anion exchange group, and thus the binder composition including the hydrophilic polymer cross-linked through such a bifunctional exchange group has anion exchange capability. Accordingly, an electrode for a capacitive deionization apparatus including an electrode composition including such a binder composition may be a cathode.

The electrode for a capacitive deionization apparatus may be manufactured by coating the electrode composition for a capacitive deionization apparatus on a current collector.

The current collector may be a graphite sheet.

The coating of the electrode composition on the current collector may be performed in a method of dip coating, spray coating, knife casting, doctor blade coating, spin coating, and the like.

The thickness of the electrode may not be particularly limited, and may be selected within an appropriate range. For example, the thickness of the electrode may be about 50 µm to about 500 µm, and specifically about 100 µm to about 350 µm.

The electrode may be manufactured by additionally coating an ion exchange polymer on a surface of the electrode material coated on the current collector.

According to at least one example embodiment, the ion exchange polymer may be a polymer including a cation exchange group such as one of a sulfonic acid group ($-SO_3H$), a carboxyl group ($-COOH$), a phosphonic group ($-PO_3H_2$), a phosphinic group ($-HPO_3H$), an arsenic group ($-AsO_3H_2$), and a selenonic acid group ($-SeO_3H$) at a main chain or a side chain of the above generally-used binder polymer, or a polymer including an anion exchange group such as one of a quaternary ammonium salt ($-NR_3$), primary or tertiary amine groups ($-NH_2$, $-NHR$, or $-NR$), a quaternary phosphonium group ($-PR_4$), and a tertiary sulfonium group ($-SR_3$) at a main chain or a side chain of the polymer. Such a polymer may be synthesized using an appropriate method, or may be a commercially available product.

In addition, at least one example embodiment provides a capacitive deionization apparatus including a cathode that is the electrode for a capacitive deionization apparatus or an anode facing it, and a spacer disposed between the cathode and the anode.

The capacitive deionization apparatus may further include a charge barrier disposed between the electrode and the spacer and made of a different material from the electrode material.

The spacer disposed between the pair of electrodes may form a path (i.e., a flow path) for flowing a fluid between the electrodes, and includes an electrically insulating material and thus prevents a short-circuit between the electrodes.

The spacer may be formed of any material for forming a flow path and preventing an electrode short-circuit, and may have any structure. As a non-limiting example, the spacer may have an open mesh, non-woven fabric, woven fabric, or foam shape. As a non-limiting example, the spacer may include polyesters such as polyethylene terephthalate and the like; polyolefins such as polypropylene, polyethylene, and the like; polyamides such as nylon and the like; an aromatic vinyl-based polymer such as polystyrene; a cellulose derivative such as cellulose, methyl cellulose, acetyl-methyl cellulose, and the like; a polyetherether ketone; a polyimide; polyvinyl chloride; or a combination thereof. The thickness of the spacer is not particularly limited, but it may range from about 50 μm to about 500 μm, for example about 100 μm to about 350 μm, in light of the flow amount and the solution resistance. The open area of the spacer may range from about 20% to about 80%, for example about 30% to about 50%, in light of the flow amount and the solution resistance.

The capacitive deionization apparatus may further include a charge barrier disposed between the spacer and the electrode. The charge barrier may be a cation permselective membrane or an anion permselective membrane. The cation or anion permselective membrane may be prepared by an appropriate method, or is commercially available. Examples of cation or anion permselective membranes which may be used in the capacitive deionization apparatus may include, but are not limited to, Neosepta CMX, Neosepta AMX, or the like manufactured by Tokuyama.

Figure 1:
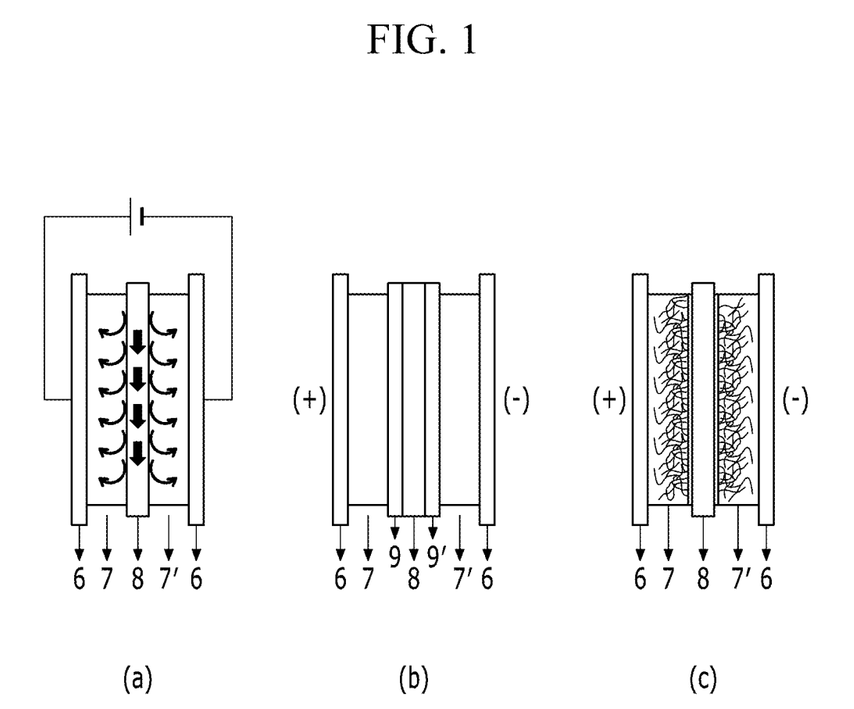
FIG. 1 is a schematic view showing examples of a capacitive deionization apparatus, according to at least one example embodiment.

The capacitive deionization apparatus may have any geometric structure. By way of non-limiting examples, the capacitive deionization apparatus may have a schematic structure as shown in FIGS. 1 (a) to (c). Hereinafter, the capacitive deionization apparatus will be explained with reference to the drawings.

Referring to FIG. 1 (a), electrodes 7 and 7' are respectively coated on current collectors 6, and a spacer 8 is interposed between the electrodes 7 and 7' to provide a flow path. In the capacitive deionization apparatus shown in FIG. 1 (b), the electrodes 7 and 7' are respectively coated on current collectors 6, a spacer 8 is inserted between the electrodes 7 and 7' to provide a flow path, and a cation permselective membrane 9' and an anion permselective membrane 9 are interposed between the electrodes 7 and 7' and the spacer 8. In addition, in the case of an apparatus shown in FIG. 1 (c), electrodes 7 and 7' are respectively coated on current collectors 6, and a spacer 8 is interposed between the electrodes 7 and 7' to define a flow path, wherein the electrode 7 is an anode using an anion exchange binder, and the electrode 7' is a cathode using a cation exchange binder.

At least one example embodiment provides a method of removing ions from a fluid using the capacitive deionization apparatus.

Specifically, the example method includes treating the fluid by providing a capacitive deionization apparatus including an electrode for a capacitive deionization apparatus, another electrode facing the electrode, and a spacer disposed between the electrodes, and applying a voltage to the electrodes while supplying an ion-containing fluid into the capacitive deionization apparatus.

The example method of treating the fluid may further include desorbing ions adsorbed in the electrodes by short-circuiting the electrodes or applying a reverse voltage to the electrodes in a reverse direction.

The details of the capacitive deionization apparatus are the same as described above.

The ion-containing fluid supplied into the capacitive deionization apparatus is not particularly limited, but for example, it may be sea water, or it may be hard water containing calcium ions or magnesium ions. The rate of supplying the fluid is not particularly limited, but may be adjusted as required. For example, the rate may range from about 5 ml/min to about 50 ml/min.

When a DC voltage is applied to the electrode while supplying the fluid, the ions present in the fluid are adsorbed onto the surface of the electrode. The applied voltage may be appropriately selected in light of the cell resistance, the concentration of the solution, or the like, and for example, it may be about 2.5 V or lower, and specifically, may range from about 1.0 V to about 2.0 V. When applying the voltage, the ion removal efficiency, as calculated from the measurement of the ion conductivity of the fluid, may be about 50% or higher, specifically about 75% or higher, and more specifically about 90% or higher.

The aforementioned capacitive deionization apparatus and the aforementioned methods may find utility in most home appliances using water, for example, a washing machine, a refrigerator, a water softener, or the like, and may also be used in an industrial water treatment device such as for seawater desalination and ultrapure water manufacture.

Hereinafter, the embodiments are illustrated in more detail with reference to examples. However, it is understood that the scope of the example embodiments is not limited to these examples.

EXAMPLE

Preparation Example 1: Synthesis of Bifunctional Cross-Linking Agent

Figure 2:
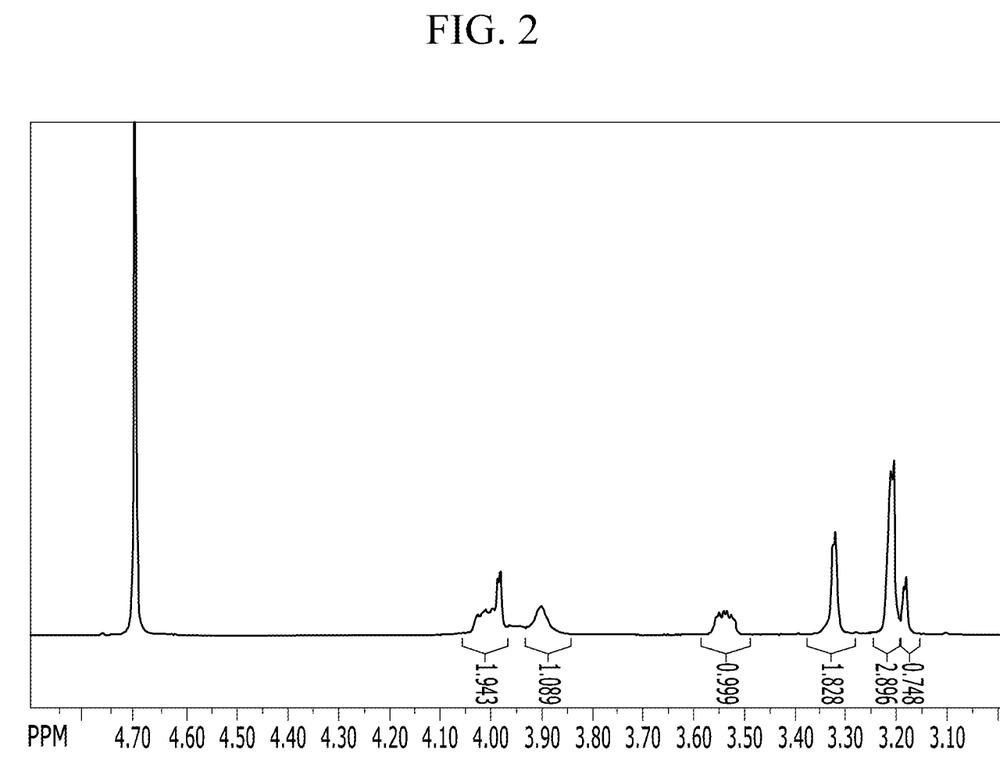
FIG. 2 is an NMR graph of the bifunctional cross-linking agent HETMEDA (N1,N2-bis(2-hydroxyethyl)-N1,N1,N2,N2-tetramethylethane-1,2-diaminium chloride) prepared in accordance with at least one example embodiment.

Chloroethanol and TMEDA (tetramethyl ethylene diamine) are mixed in a mole ratio 2:1 in a solvent of DMF (dimethylformamide) as shown in Reaction Scheme 1 below, and the mixture is refluxed for a reaction over one night. When the reaction is complete, a product therein is cleaned with DMF and dried, obtaining a final resulting material. HETMEDA is synthesized in a yield of 80%, and herein, the synthesized resulting material is obtained as a white powder, and its structure may be examined through NMR (refer to FIG. 2).

(Reaction Scheme 1)

On the other hand, the HETMEDA may be additionally reacted according to the following Reaction Scheme 2 to prepare a bifunctional cross-linking agent having a carboxyl group at both terminal ends.

(Reaction Scheme 2)

Example 1: Manufacture of PAA-HETMADE Polymer Membrane

A polymer solution is prepared by dissolving the synthesized cross-linking agent of the HETMEDA according to Preparation Example 1 in a polyacetic acid (PAA) (weight average molecular weight of 1,000,000) aqueous solution (a 10% aqueous solution) to be in each amount of 10 wt %, 20 wt %, 30 wt %, 40 wt %, and 50 wt % with reference to weight of the polymer in the polyacetic acid (PAA) aqueous solution. The polymer solutions are respectively coated to be 500 μm thick on a glass plate by using a doctor blade and dried at room temperature for 2 hours. After drying at room temperature, the glass plates are heated in a 130° C. oven for 3 hours, manufacturing each ion conductive polymer membrane. The ion conductive polymer membranes are cut to a size of 1 cm$^2$, and ion conductivity of the polymer membranes is measured. Ion conductivity change of the polymer membranes depending on the amounts of the HETMEDA is provided in FIG. 5.

Comparative Example 1: Manufacture of PVA-Glutaric Acid-GTMA Polymer Membrane

A polymer membrane is manufactured according to the same method as in Example 1, except for using a polyvinyl alcohol (PVA) aqueous solution (a 10% aqueous solution) having a weight average molecular weight of 89,000 as a polymer and glutaric acid instead of HETMEDA as a cross-linking agent. In other words, a polymer solution is prepared by dissolving each amount of 10 wt %, 20 wt %, 30 wt %, 40 wt %, and 50 wt % of glutaric acid and 30 wt % of GTMA (glycyl trimethyl ammonium) as an ion exchange functional group based on the weight of the polymer in a polyvinyl alcohol (PVA) aqueous solution. This polymer solution is coated according to the same method as in Example 1 to manufacture an ion conductive polymer membrane, and ion conductivity change of the polymer membrane is provided in FIG. 5.

Example 2: Manufacture of PAA-PVA-HETMEDA-Glutaric Acid Polymer Membrane

A polymer membrane is manufactured according to the same method as in Example 1 by mixing 5 g of an aqueous solution including 10 wt % of polyacetic acid (PAA) (Mw=500,000), 7.5 g of an aqueous solution including 10 wt % of polyvinyl alcohol (PVA) (Mw=89,000), each amount of 10 wt %, 20 wt %, 30 wt %, 40 wt %, and 50 wt % of the HETMEDA based on the weight of the polyacetic acid (PAA), and 50 wt % of glutaric acid based on the weight of the polyvinyl alcohol (PVA) to prepare a polymer solution. Ion conductivity of the polymer membranes depending on the amount of the HETMEDA is provided in FIG. 6. In addition, ion conductivity of the polymer membrane according to Example 1 depending on the amount of the HETMEDA is provided in FIG. 6.

Figure 6:
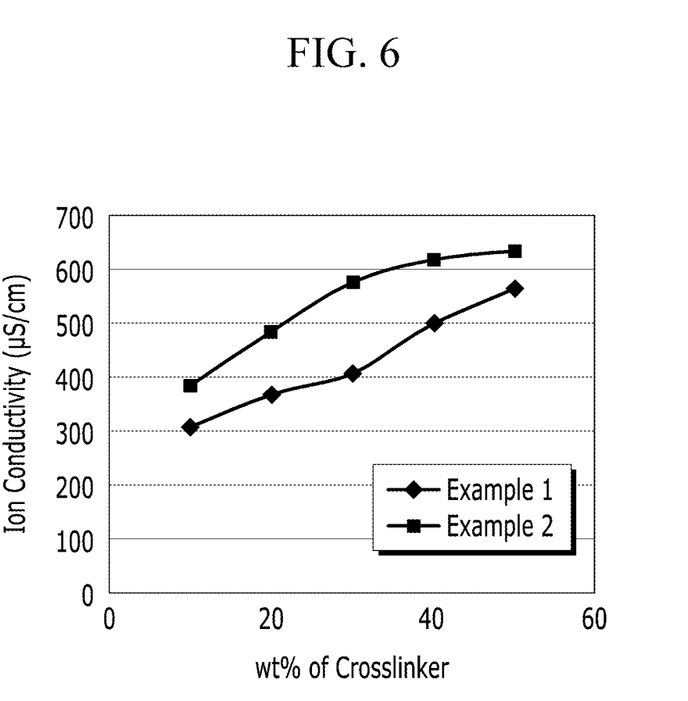
FIG. 6 is a graph showing ion conductivity of polymer membranes according to example embodiments depending on the addition amount of the HETMEDA as a bifunctional cross-linking agent.

As shown in FIG. 6, a polymer membrane including only the polyacetic acid (PAA) polymer that is cross-linkable with the HETMEDA shows higher ion conductivity than a polymer membrane partially including the polyvinyl alcohol (PVA) not cross-linkable with the HETMEDA. A polymer membrane using a mixed polymer of the PAA and the PVA shows increasing ion conductivity in proportion to the increasing amount of the HETMEDA but decreasing ion conductivity compared to a polymer membrane including the PAA as a polymer alone in proportion to the amount of the PVA cross-linkable with the HETMEDA.

Evaluation: Ion Conductivity of Polymer Membrane

Figure 5:
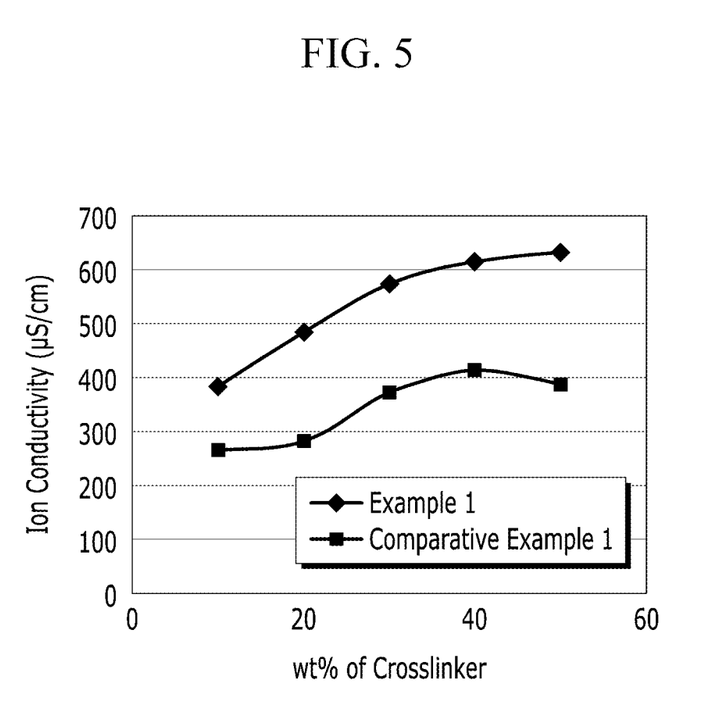
FIG. 5 is a graph showing ion conductivity of polymer membranes according to an example embodiment and a comparative example depending on the addition amount of a cross-linking agent.

As shown in FIG. 5, the PVA polymer membrane using glutaric acid as a cross-linking agent shows increasing ion conductivity as the amount of the cross-linking agent is increased, but when the cross-linking agent is included in an amount of greater than 40 wt % of the polymer weight, ion conductivity of the polymer membrane starts to decrease. The reason is that when the cross-linking agent is excessively included in an amount of greater than about 40 wt % of the polymer weight, an ion exchange functional group of GTMA in a PVA polymer is cross-linked by the cross-linking agent as much as grafted and leaves insufficient ion exchange functional groups in the polymer.

On the other hand, when a PAA polymer membrane including the HETMEDA as a cross-linking agent includes up to about 50 wt % of the cross-linking agent based on the polymer weight, ion conductivity of the polymer membrane does not decrease but keeps increasing as the amount of the cross-linking agent is increased. In other words, the cross-linking agent includes a functional group having ion exchange performance and thus has no unfavorable influence on ion conductivity of the polymer membrane, even though the amount of the cross-linking agent is increased.

In addition, as shown from FIG. 6, a polymer membrane manufactured by using the HETEMDA cross-linking agent with the PAA shows increasing ion conductivity as the amount of the HETMEDA is increased, and a PAA-PVA mixed polymer membrane shows increasing ion conductivity as the amount of the HETMEDA shows lower ion conductivity than a polymer membrane only including the PAA by as much as the PVA not cross-linkable with the HETMEDA.

Examples 3 to 5: Preparation of Cathode for CDI

According to at least one example embodiment, a cathode for CDI is manufactured by mixing an active material, a conductive agent, and a binder composition.

As for the active material, activated carbon powder PWG (specific surface area=1600 m$^2$/g; Kuraray Inc.) is used, and as for the conductive agent, Super P carbon (average diameter=19 nm) (Timcal Ltd.) is used. The binder composition is prepared by mixing the components as in the following Table 1. In other words, the binder composition is prepared by mixing a 10 wt % PAA aqueous solution and/or a 10 wt % PVA aqueous solution in a composition in the following Table 1, adding each amount of 7 wt %, 20 wt %, and 30 wt % of the HETMEDA as a cross-linking agent thereto based on the polymer weight in the PAA aqueous solution and 50 wt % of glutaric acid as another cross-linking agent based on the polymer weight in the PVA aqueous solution thereto, as well as 50 wt % of GTMA as an anion exchange functional group based on the polymer weight in the PVA aqueous solution, and then agitating the mixture. Herein, another binder composition as a control group is prepared by using no PAA polymer aqueous solution but only using a PVA polymer aqueous solution and glutaric acid as a cross-linking agent and GTMA, respectively, as an ion exchange functional group in an amount of 50 wt % based on the amount of the PVA polymer.

Each binder compositions is respectively mixed with 3.0 g of activated carbon powder (PGW) and 0.45 g of Super P carbon as a conductive agent to prepare each electrode slurry according to the control group and Examples 3 to 5. Subsequently, the electrode slurries are respectively coated on both sides of a conductive graphite sheet (thickness=380 μm) to be about 200 μm thick on each side and dried at room temperature, manufacturing cathodes according to Examples 3 to 5.

TABLE 1

|  | PAA 10% aqueous solution | PVA 10% aqueous solution | HETMADE | Glutaric acid | GTMA |
|---|---|---|---|---|---|
| Control group | 0 g | 12.6 g | 0 g | 0.63 g | 0.63 g |
| Example 3 | 7.6 g | 5 g | 0.0532 g | 0.25 g | 0.25 g |
| Example 4 | 8.6 g | 4 g | 0.172 g | 0.20 g | 0.20 g |
| Example 5 | 9.6 g | 3 g | 0.288 g | 0.15 g | 0.15 g |

Preparation Example 2: Preparation of Anode for CDI

An anode is manufactured by mixing 12.6 g of a 10 wt % PVA aqueous solution with 3.0 g of activated carbon powder (PGW) (specific surface area=1600 m$^2$/g) (Kuraray Inc.) and 0.45 g of Super P Carbon (average diameter=19 nm) (Timcal Ltd.) as a conductive agent to prepare an electrode slurry, coating the electrode slurry on both sides of a conductive graphite sheet (a thickness=380 μm) to be about 200 μm thick on each side with a doctor blade, and drying the coated conductive graphite sheet at room temperature.

Preparation Example 3: Assembly of CDI Apparatus

The cathodes according to the control group and Examples 3 to 5 and the anode according to Preparation Example 2 are used with a water-permeable open polyamide mesh as a spacer.

A CDI apparatus is manufactured by stacking the anode (thickness: about 150 μm)/spacer/the cathode (thickness: about 150-200 μm) in order and assembling them with a screw.

Experimental Example: Ion Removal Performance of Capacitive Deionization (CDI) Apparatus Each CDI apparatus is used to perform an ion adsorption removal experiment according to the following example process, and the results are provided in the following Table 2.

The CDI apparatus is operated at room temperature and supplied with a standard hard water solution including 250 mg/L of CaCO$_3$ (conductivity: about 800 μS/cm) at a speed of 27-28 mL/min.

The standard hard water solution is deionized by connecting each electrode of the CDI apparatus to a power supply and maintaining a cell voltage (a potential difference between an anode and a cathode) at 1.5 V for one minute, and the CDI apparatus is regenerated at −0.8 V for 5 minutes.

Conductivity of water passed through the apparatus is measured by using a flow-type conductivity sensor.

The charged charge amount from the amount of current supplied from the power supply is measured in each step.

Discharge (regeneration): 100 ppm NaCl is made to sufficiently flow in the CDI unit cell until a current stop (i.e., until the charged charge amount used during the deionization is all discharged, for example, for 10 minutes) and herein, a flow rate is 10 mL/min and a voltage is 0 V.

The ion conductivity measurement is used to calculate an ion removal rate (%) of the CDI as follows.

Ion removal rate (%)=(conductivity of inflow water−conductivity of outflow water)/(conductivity of inflow water)*100

Figure 7:
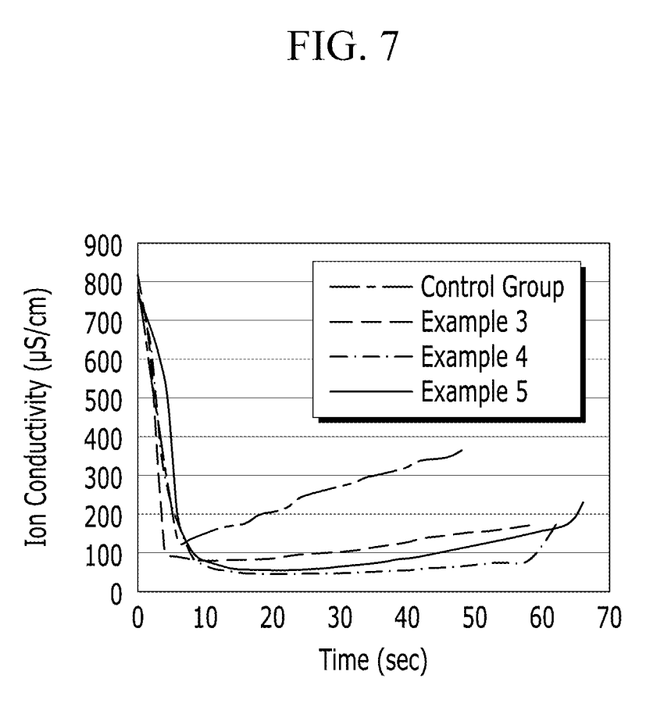
FIG. 7 is a graph showing ion conductivity of each cathode for CDI manufactured by using binder compositions according to example embodiments and a binder composition including PVA, glutaric acid, and an ion exchange functional group according to a control group.

According to at least one example method, ion conductivity of cathodes for CDI apparatus including the binders according to the control group and Examples 3 to 5 is measured, and the results are provided in FIG. 7.

As shown in FIG. 7, the cathode using the binder including 20 wt % of the HETMEDA as a cross-linking agent according to Example 4 shows the lowest ion conductivity, and thus an electrode including the cathode shows superior ion removal efficiency. Example 5 including 30 wt % of the HETMEDA shows somewhat higher ion conductivity than an electrode including 20 wt % of the HETMEDA, but much lower ion conductivity than the electrode of the control group. In addition, since the cathode using the binder including 7 wt % of the HETMEDA according to Example 3 shows sufficiently low ion conductivity compared to the electrode of the control group, an electrode for CDI using a binder including the HETMEDA within the range shows excellent ion removal efficiency. While this invention has been described in connection with what is presently considered to be practical example embodiments, it is to be understood that the invention is not limited to the disclosed example embodiments, but, on the contrary, is intended to cover various modifications and equivalent arrangements included within the spirit and scope of the appended claims. Therefore, the aforementioned example embodiments should be understood to be examples but not limiting the inventive concepts in any way.

What is claimed is:

1. An electrode composition of a capacitive deionization apparatus including an electrode binder composition, an electrode active material and a conductive material, the electrode binder composition comprising:
   at least one hydrophilic polymer; and
   a bifunctional cross-linking agent, the bifunctional cross-linking agent having one of a hydroxy group and a carboxyl group at terminal ends thereof, and at least one anion exchange group therein, and the bifunctional cross-linking agent being configured to be cross-linked with the at least one hydrophilic polymer;
   wherein the at least one hydrophilic polymer includes one of:

a polymer including a carboxyl group side chain configured to be ester-bonded to the hydroxy group of the bifunctional cross-linking agent, a polymer including a hydroxy group side chain configured to be ester-bonded to a carboxyl group of the cross-linking agent, and a polymer including both the carboxyl group side chain and the hydroxy group side chain, and the conductive material including at least one of VGCF (Vapor Growth Carbon Fiber), natural graphite, artificial graphite, acetylene black, ketjen black, and carbon fiber.

2. The electrode composition of claim 1, wherein the at least one hydrophilic polymer comprises one of polyacrylic acid (PAA), polyacrylic acid-co-maleic acid, polyvinyl alcohol (PVA), carboxylmethyl cellulose, hydroxypropyl cellulose, carboxylated polyvinylchloride, chitosan, polyacrylamide-co-acrylic acid, a polystyrene-co-acrylic acid copolymer, and a combination thereof.

3. The electrode composition of claim 1, wherein the at least one hydrophilic polymer comprises one of polyacrylic acid (PAA), polyvinyl alcohol (PVA), and a mixture thereof.

4. The electrode composition of claim 3, wherein the bifunctional cross-linking agent is represented by the following Chemical Formula 4 or 5:

[Chemical Formula 4]

[Chemical Formula 5]

5. The electrode composition of claim 1, wherein the bifunctional cross-linking agent is represented by Chemical Formula 1:

[Chemical Formula 1]

wherein:
$R^1$ and $R^2$ are same radicals or different radicals and comprise independently one of a hydroxy group and a carboxyl group,

$R^3$ to $R^5$ are independently same radicals or different radicals and comprise one of a C1 to C10 alkylene, a C3 to C10 cycloalkylene, a C6 to C12 arylene, and a combination thereof, $R^6$ to $R^9$ are independently the same or different and comprise one of hydrogen, a C1 to C10 alkyl, a C3 to C10 cycloalkyl, a C6 to C12 aryl, and a combination thereof, and

X and Y each comprise independently one of a nitrogen (N) and a phosphorus (P) atom.

6. The electrode composition of claim 1, wherein the bifunctional cross-linking agent is represented by one of Chemical Formula 2 and Chemical Formula 3:

[Chemical Formula 2]

[Chemical Formula 3]

wherein:
$R^3$ to $R^5$ are independently the same or different and comprise one of a C1 to C10 alkylene, a C3 to C10 cycloalkylene, a C6 to C12 arylene, and a combination thereof, $R^6$ to $R^9$ are independently the same or different and comprise one of hydrogen, a C1 to C10 alkyl, a C3 to C10 cycloalkyl, a C6 to C12 aryl, and a combination thereof.

7. The electrode composition of claim 1, wherein the electrode binder composition further comprises at least one additional hydrophilic polymer not cross-linkable with the bifunctional cross-linking agent and an additional cross-linking agent cross-linkable with the at least one additional hydrophilic polymer.

8. The electrode composition of claim 7, wherein the additional cross-linking agent is one of ethylene glycol, glycerol, 1,6-hexanediol, 1.4-butanediol, glutaric acid, glutaraldehyde, succinic acid, succinic anhydride, adipic acid, phthalic acid, ethylene glycol diglycidyl ether, sulfosuccinic acid, sulfosalicylic acid, succinic acid amine, ethylenediamine, and a combination thereof.

9. The electrode composition of claim 1, wherein the electrode binder composition further comprises a compound including an ion exchange functional group.

10. The electrode composition of claim 9, wherein the compound including the ion exchange functional group is one of tetrabutylammonium hydroxide, tetrabutylammonium acetate, tetraethylammonium hydroxide, tetraethylammonium acetate, tetramethylammonium hydroxide, tetramethylammonium acetate, and a combination thereof.

11. The electrode composition of claim 9, wherein the compound including the ion exchange functional group is in an amount of about 5 wt % to about 50 wt % based on the weight of the at least one hydrophilic polymer.

12. The electrode composition of claim 1, wherein the bifunctional cross-linking agent is in an amount of about 0.5 wt % to about 60 wt % based on the weight of the at least one hydrophilic polymer.

13. The electrode composition of claim 1, wherein the electrode active material is an activated carbon-based material comprising one of activated carbon powder, activated carbon fiber, carbon nanotubes, carbon aerogel, mesoporous carbon, graphite oxide, and a mixture thereof.

14. The electrode composition of claim 1, wherein the electrode active material is in an amount of about 50 wt % to about 400 wt % based on the weight of the at least one hydrophilic polymer.

15. The electrode composition of claim 1, wherein the electrode active material is in an amount of about 100 wt % to about 300 wt % based on the weight of the at least one hydrophilic polymer.

16. An electrode for a capacitive deionization apparatus comprising the electrode composition of claim 1.

* * * * *